United States Patent
Leonard

[11] 3,903,781
[45] Sept. 9, 1975

[54] KEYBOARD PROGRESSION TEACHING AID

[76] Inventor: Verna M. Leonard, 6351 N. Blackstone, Fresno, Calif. 93721

[22] Filed: Feb. 22, 1974

[21] Appl. No.: 444,896

[52] U.S. Cl. .................................. 84/471; 84/474
[51] Int. Cl.² ........................................ G09B 15/02
[58] Field of Search ............ 84/471, 473, 474, 480, 84/485

[56] References Cited
UNITED STATES PATENTS

| | | | |
|---|---|---|---|
| 336,595 | 2/1886 | Rosecrans | 84/473 |
| 848,282 | 3/1907 | Berg | 84/471 X |
| 2,944,349 | 7/1960 | Kaufman | 84/473 X |
| 3,481,241 | 12/1969 | Gaillard | 84/474 |
| 3,733,956 | 5/1973 | Leonard | 84/471 |

*Primary Examiner*—Lawrence R. Franklin
*Attorney, Agent, or Firm*—Ralph S. Branscomb

[57] ABSTRACT

A teaching aid for students of the piano and other keyboard instruments to assist the student in learning keyboard fingering, note reading, scale tone names, the association of the scale tones with note position on the musical staff and on the keyboard, and the repetitive nature of the musical scale as revealed in the consecutive octave structure of the keyboard.

The assembly comprises a rigid panel to which are mounted several groups of selectively exposable strips and panels and a rotatable disc, the panels, strips and discs displaying various arrays of intercorrelated musical indicia, with one of the groups of panels having certain of the musical data thereon deleted, to be filled in by the student.

3 Claims, 7 Drawing Figures

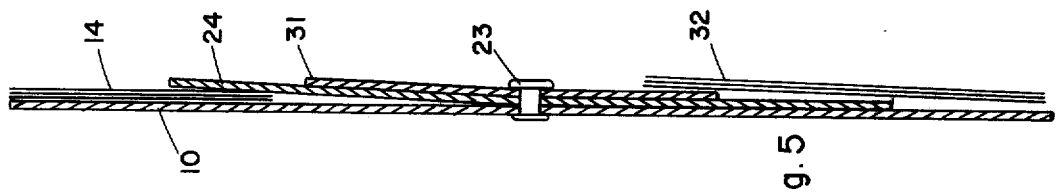
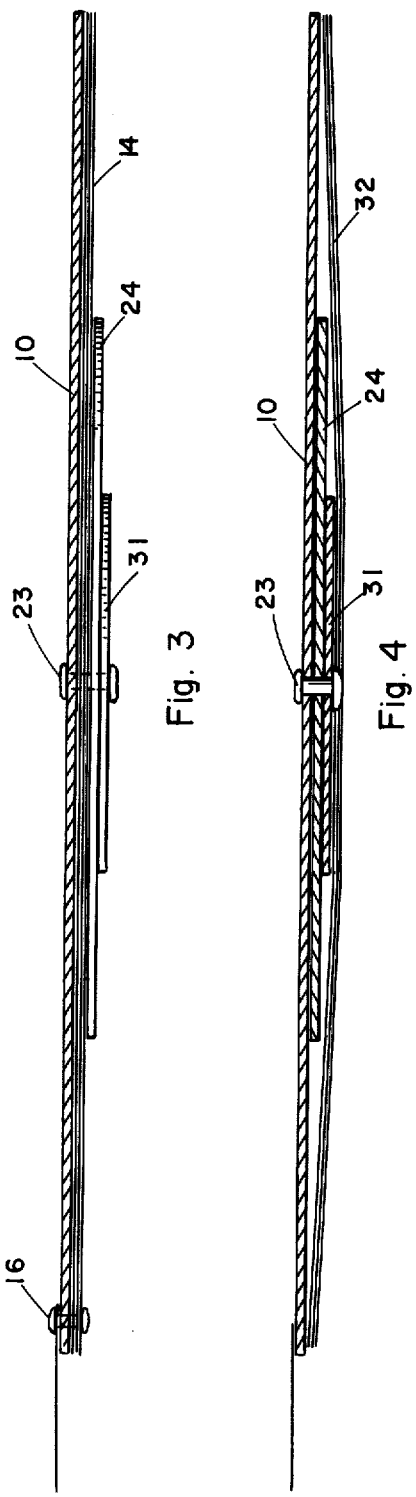
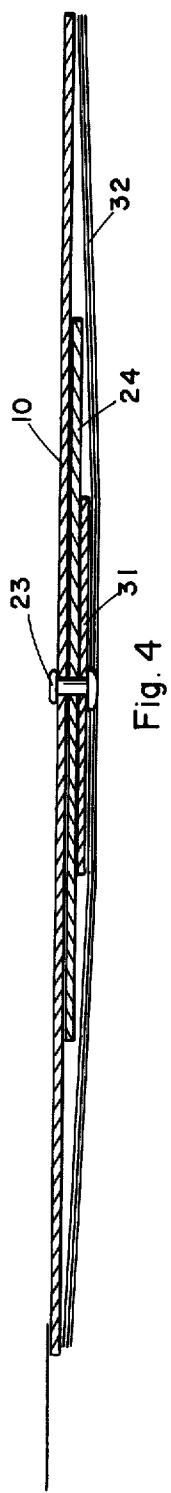
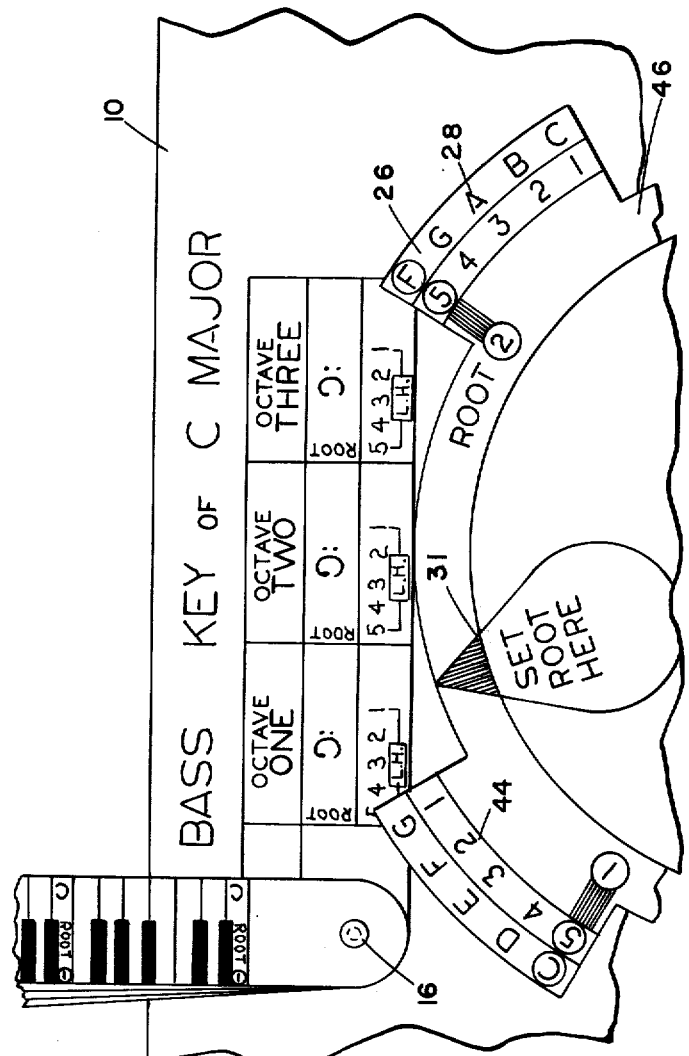

KEYBOARD PROGRESSION TEACHING AID

BACKGROUND OF THE INVENTION

Many musical teaching aids have been developed to teach the student the various skills and theory required of a musician. Of these devices the majority teach one or two concepts which the student often has subsequent difficulty integrating into the overall body of musical theory. Another frequent drawback in the use of these devices is the failure to actively involve the student in participation with the teaching aid other than reading the displayed material and practicing keyboard fingering.

There is a need for a teaching aid that correlates keyboard fingering, note reading, scale tone names, the octave structure of the diatonic scale and the piano keyboard, diatonic scale structure, and other related ideas, and requires the active participation of the student.

SUMMARY OF THE INVENTION

The present invention is a device which displays and correlates a vast amount of musical information and requires the student to express himself and test his grasp of the subject matter.

The invention comprises a substantially rigid rear panel to which are mounted (1) a plurality of selectively exposable strips bearing representations of a piano keyboard, (2) a rotatable disc having twelve peripherally arrayed arrays of indicia, each denoting a key signature and a plurality of consecutive scale tones of the diatonic scale associated with the key signature, and two groups of selectively exposable panels, one having one or more staffs with the notes of a scale thereon and the scale tone names associated with the notes, and the other having one or more blank staffs with a series of blank squares where the student can write in the notes of a scale and the associated scale tone names.

Other features are incorporated which will become evident, along with the relationships among the elements thus for mentioned, from the following description.

BRIEF DESCRIPTION OF THE DRAWINGS

FIG. 3 is a section taken along line 3—3 of FIG. 2;

FIG. 4 is a section taken along line 4—4 of FIG. 2;

FIG. 5 is a section taken along line 5—5 of FIG. 2;

FIG. 6 is a front elevation of a portion of a modification of the device; and

DETAILED DESCRIPTION OF THE PREFERRED EMBODIMENT

Figure 1:
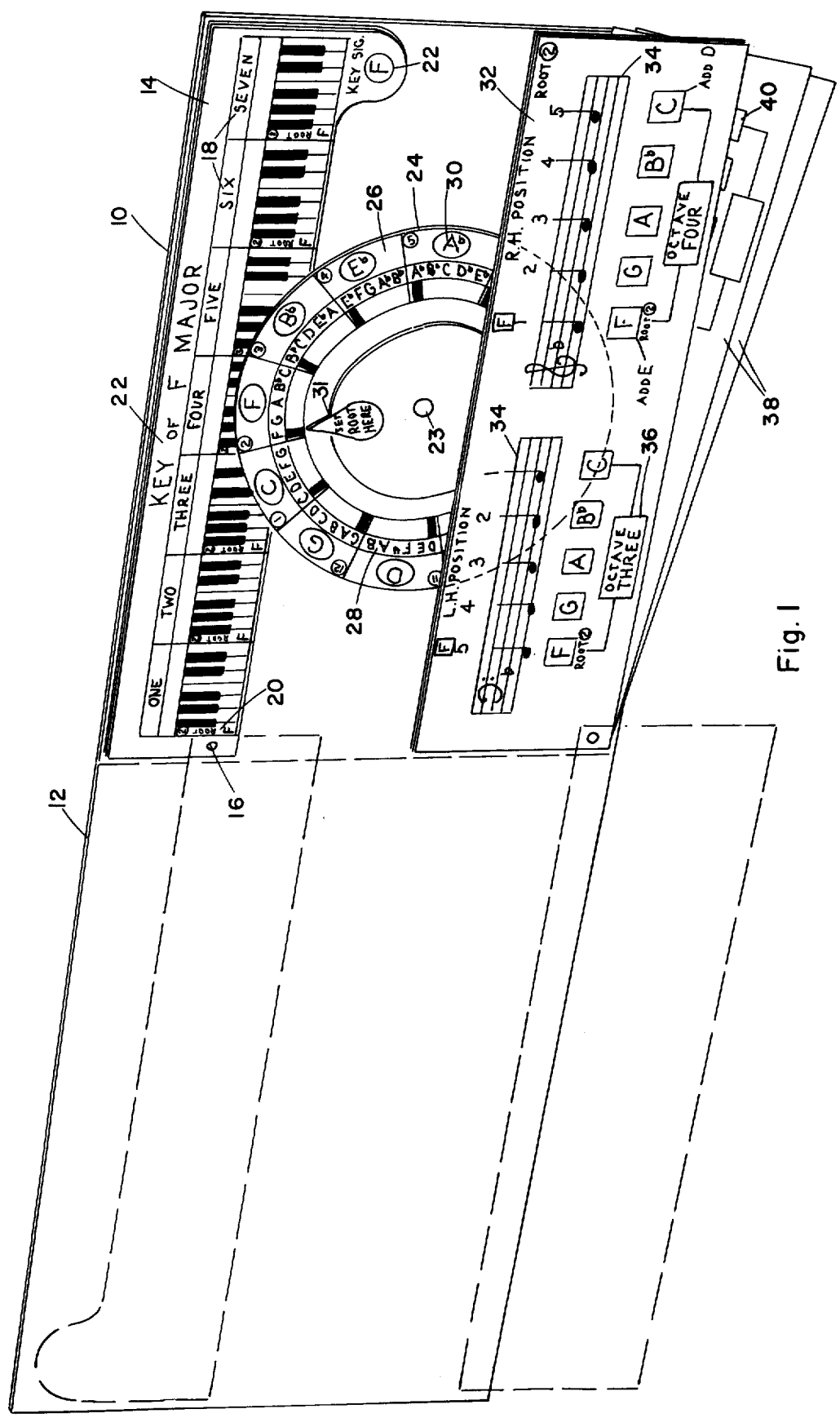
FIG. 1 is a perspective view of the simplest form of the teaching aid as it appears when arranged to teach in the key of F.
Figure 2:
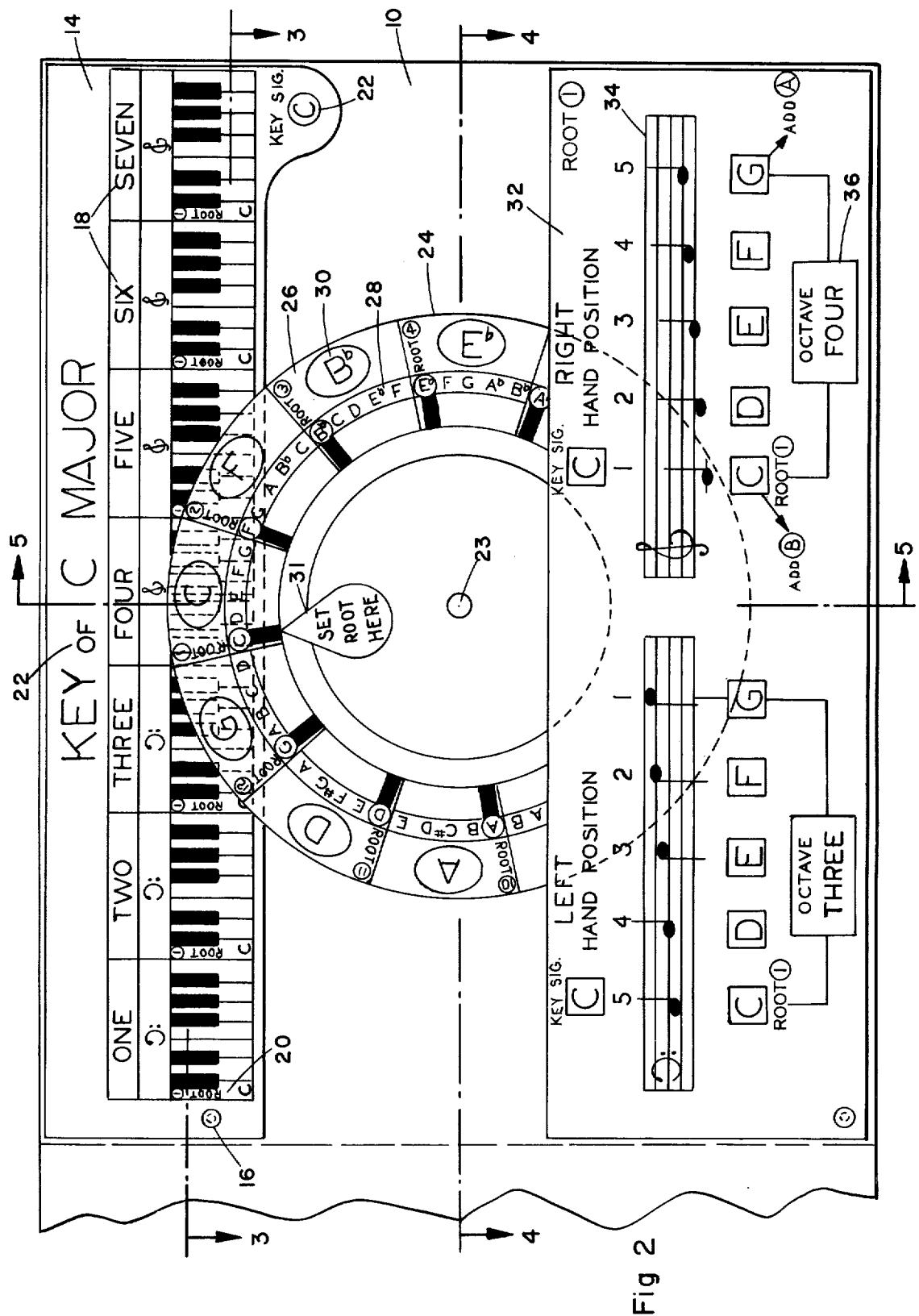
FIg. 2 is a front elevation view of the teaching aid illustrated in FIG. 1 but re-arranged to teach in the key of C.

Referring first to FIGS. 1 - 5, the teaching aid has a substantially rigid rear panel 10 to which all parts are mounted. The panel may be made of stiff paper, cardboard, plastic or the like and may have an extended left side 12 useable as a folding cover, or merely to provide the structure with more stability on the music rack.

A group of selectively exposable strips 14, preferably made of stiff paper, are pivotally attached to the rear panel by a brad or rivet 16 so as to fall into substantial alignment with the upper margin of the rear panel when in the position illustrated in solid lines in the drawings. Any number of the strips can be pivoted to the position shown in phantom to expose any particular strip.

Each strip has thereon a representation of a piano keyboard sub-divided into consecutive octaves which are preferably numbered from left to right as at 18 and display the appropriate bass or treble clef sign. The octave division of each strip is different from every other strip, so that the leftmost, or beginning, key of each octave differs from one strip to the next and is identified with indicia as at 20 which indicates the name of the scale tone of the key and preferably the root number, which will be the subject of further explanation. A diatonic scale beginning on the scale tone indicated at 20 will have an associated key signature which is identical to the scale tone name, and should be displayed on each strip as at 22.

There are 12 diatonic scales in the western music system and thus the strips should be provided in this number. The order of the strips should be provided in accordance with the cycle of fourths beginning with C, which will be further explained, the first two strips representing the key signatures of C and F in FIGS. 2 and 1, respectively.

Rotatably mounted by a brad or rivet 23 on the rear panel somewhat below the strips is a dial or disc 24 which may or may not overlap the strips. The dial is provided with a plurality of arrays of indicia arranged in 12 peripheral segments 26. Each array comprises the names of several consecutive scale tones comprising a mini-scale of a particular diatonic scale, illustrated at 28, and the key signature 30 associated with the scale. Each of the mini-scales begins on the root tone of the diatonic scale, and the word "Root" is displayed near this tone along with a number which will be called the root number. The root number system plays a fairly important role in the use of the invention.

The indicia in the segments 26, each of which displays a particular diatonic scale and the associated key signature, are arranged in the clockwise direction in accordance with the cycle of fourths beginning at the Key of C.

The cycle of fourths is a common arrangement wherein each key signature is identical to the upper note of the diatonic fourth interval, using the root of the preceeding key signature as the base note. For example, the interval C – F is a diatonic fourth in the key of C, and the key of F therefore follows the key of C in the cycle of fourths as can be seen on the dial 24.

The root numbers enable the student to clearly visualize the progression of fifths key signature arrangement, and understand its cyclic nature. This system is used in companion inventions and musical instruction publications. Any chosen root number will identify the root tone, the key signature, and a particular diatonic scale.

In use, the student turns the dial 24 until the desired segment thereon is uppermost, and then exposes the particular one of the strips 14 having the corresponding root number and key signature. By comparing the strip to the information on the dial, a clear picture is obtained of the way in which the keyboard should be mentally divided when playing in that particular key, where the root tones are on the keyboard, and the names of the first 5 scale tones in that key. A pointer 31 may also be provided. The pointer is pivoted to the rear panel and the disc at the center of the disc and can be set to indicate the root tone of the mini-scale the student has chosen.

Turning now to the remaining structure, a group of selectively exposable panels 32 are attached, preferably pivotally by means of a brad or rivet, to the lower portion of the rear panel 10. These panels are most practically made of slightly stiff paper and have displayed thereon at least one and preferably two musical staffs 34 with notes on the staffs which correspond to the scale tones identified in one of the segments 26. The key signature is indicated on each panel, along with the root number and, if desired, a recapitulation of the names of the scale tones.

It is intended that the student will play the notes of the left staff with the left hand and the notes of the right staff with the right hand, and indicia to that effect may be displayed above each staff as illustrated.

The student can now associate the note position on the staffs with the scale tone names, the key signature with the mini-scale he is playing, and visualize the relative position of the key in which he is playing in the cycle of fifths represented on the dial 24. In addition, in order to tie the notes on the staffs to the corresponding keys on the keyboard, indicia are provided at 36 indicating in which of the octaves of the keyboard the notes belong.

The panels 32 of course need not be restricted to 12, but may be provided in any number, representing any combination of octaves in any of the 12 key signatures. The student selects any panel he pleases, and then exposes the appropriate strip and disc segment before beginning to play.

A second group of panels are indicated at 38 which is similar to the group 32 except some or all of the information displayed on the individual panels 32 is deleted, leaving in the illustrated embodiment a blank staff or staves and a series of empty boxes 42. The student is required to fill in the staves and boxes with notes and scale tone names appropriate to the scales in the octave he has selected. Appropriate spaces may also be provided for the inscription of the key signature, octave number, and root number, as shown. The student may check his work against the corresponding panel from the group 32.

Figure 7:
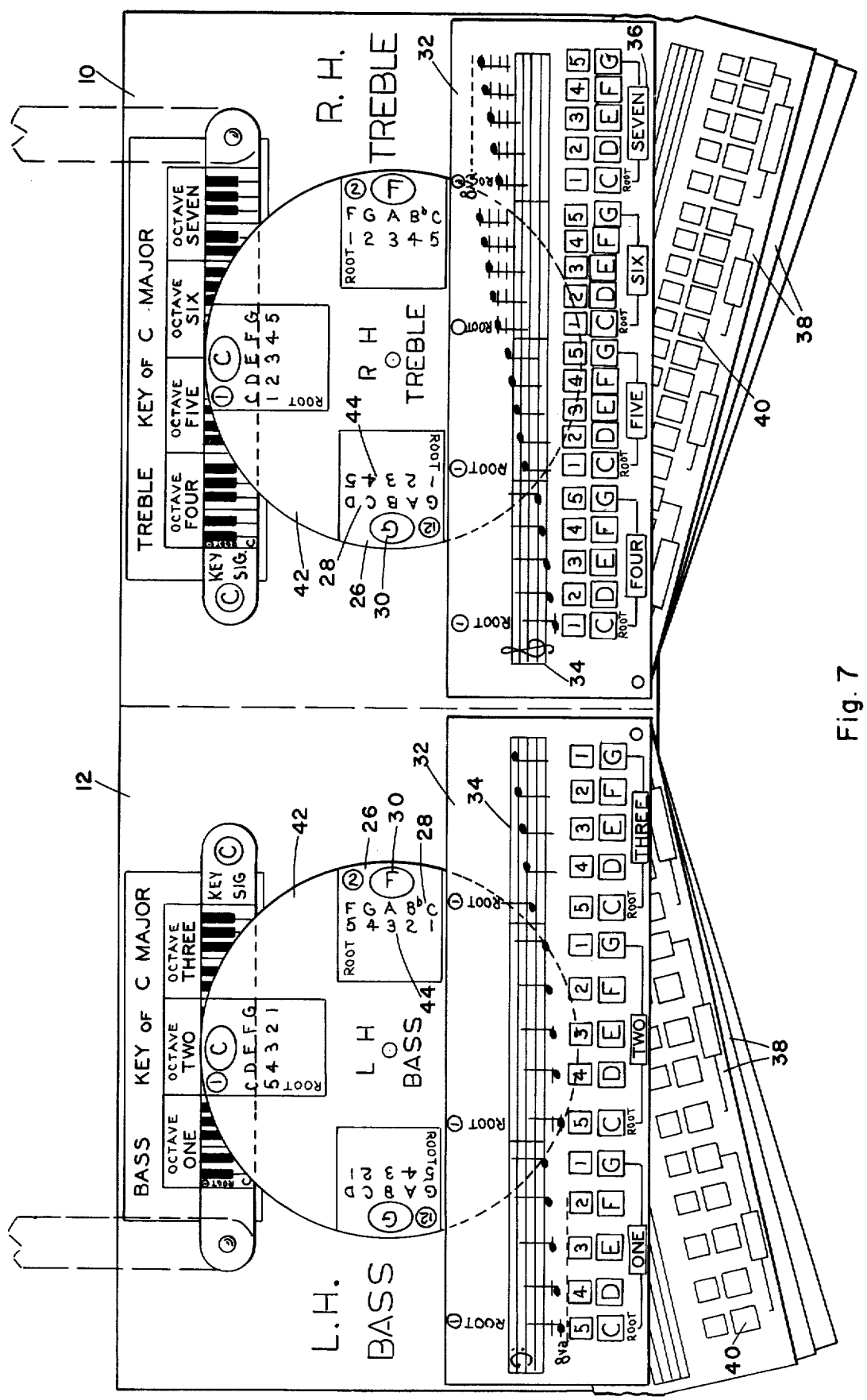
FIG. 7 is a front elevational view of another modification of the device.

FIG. 7 illustrates a modification of the device in which the strips 14 have been provided in two groups to indicate separately the left and right portions of the keyboard. The panels 32 and 38 have also been provided in two separate groups, with the staffs on the panels being expanded to accommodate an increased number of notes to span the multiple octaves represented on the keyboard strips.

FIG. 7 also illustrates a modified dial 42 provided in duplicate and on which a portion only of the 12 possible diatonic scales are represented, and including indicia 44 adjacent the scale tone names denoting the number sequence of the player's fingers used to play the scale.

The dial 46 fragmentarily illustrated in FIG. 6 is a further variation of dial 42 having marginal portions removed to increase the visibility of the strips 14.

It is intended that any reasonable combination of the above-mentioned parts may be used, the illustrated arrangements being exemplary only. Other methods of mounting the strips 14 and panels 32 and 38 are conceiveable, such as a hinged arrangement, and of course the panels 38 could be deleted entirely, as in FIG. 2, without eliminating the utility of the invention.

I claim:

1. A keyboard progression teaching aid comprising: a substantially rigid rear panel;
   two groups of selectively displayable strips mounted respectively on the left hand and right hand sides of an upper portion of said panel, each of the strips of the left one of said groups bearing a representation of the three leftmost octaves on a keyboard and each of the strips of the right one of said groups bearing a representation of four octaves of the keyboard adjoining said leftmost octaves;
   each of said strips having the octaves represented thereon being numbered consecutively and having indicia thereon identifying the scale tone associated with the first key of each octave represented thereon;
   a pair of discs rotatably mounted on said rear panel each being substantially below one of said strip groups and having in peripherally arranged segments a plurality of arrays of indicia;
   each of said arrays of indicia comprising the names of at least a portion of the scale tones of a different diatonic scale and the name of the key signature to which the diatonic scale belongs;
   a left and right group of selectively exposable panels mounted on a lower portion of said rear panel;
   each of said exposable panels having displayed thereon
   a. at least one musical staff having the notes of a diatonic scale thereon, the notes on the left strips being in the bass clef and the notes on the right strips being in the treble cleff;
   b. indicia denoting the key signature associated with the scale, and
   c. indicia indicating to which of the consecutively numbered octaves of the keyboard represented on the appropriate strip the scale belongs,
   whereby upon rotation of either of the discs and selection of a particular segment thereon, and selection of a strip from each group bearing an appropriate keyboard representation, a student can learn to associated different scale progressions with an instrument keyboard.

2. Structure according to claim 1 wherein each of said exposable panels has additional indicia thereon representing a plurality of blank squares to be filled in with scale tone names by the student.

3. Structure according to claim 1 wherein the first-mentioned group of exposable panels is pivoted at a left portion thereof to a left portion of the lower portion of the rear panel, and said second group is pivoted at a right portion thereof to a right portion of the lower portion of said rear panel.

* * * * *